(No Model.) 6 Sheets—Sheet 2.

G. W. DUDLEY.
ADDING MACHINE.

No. 555,038. Patented Feb. 18, 1896.

WITNESSES:
Fred G. Dieterich
Jos. A. Ryan

INVENTOR
George W. Dudley
BY Munn & Co
ATTORNEYS.

(No Model.) 6 Sheets—Sheet 3.
G. W. DUDLEY.
ADDING MACHINE.
No. 555,038. Patented Feb. 18, 1896.
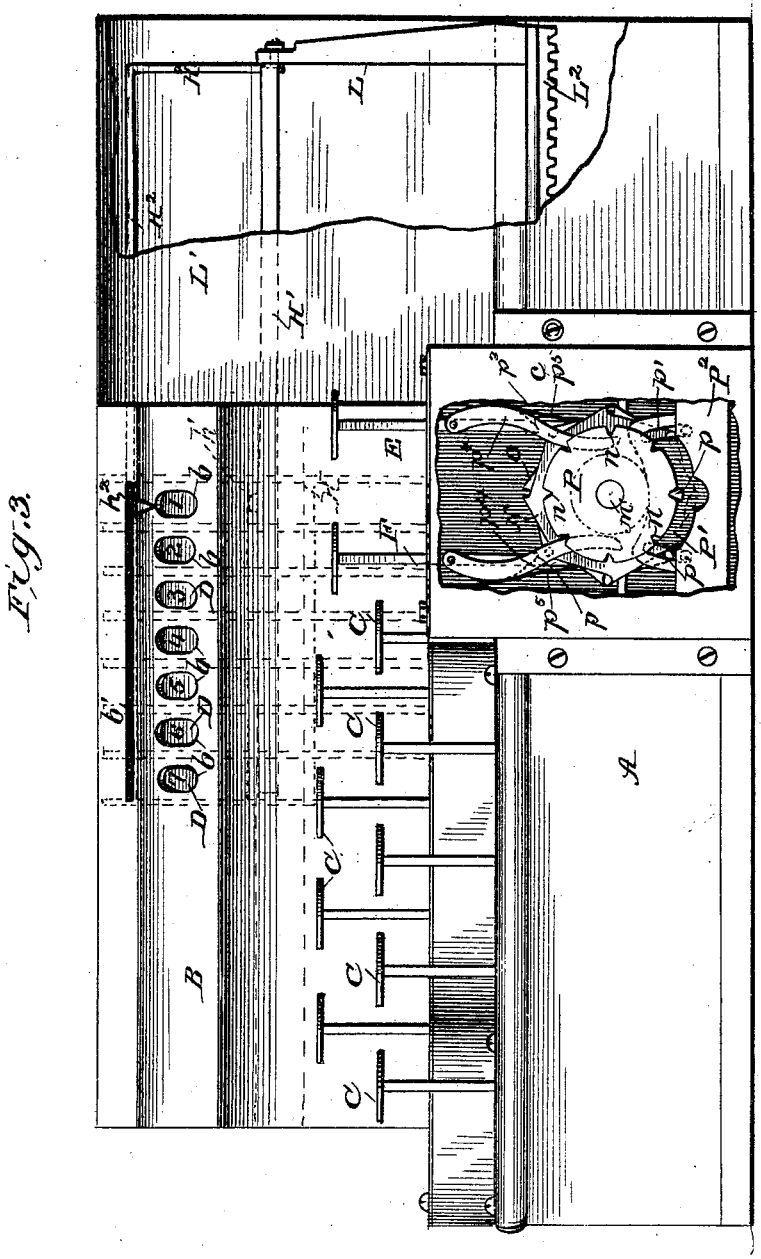
WITNESSES:
Fred G. Dieterich
Jos. A. Ryan
INVENTOR
George W. Dudley.
BY 
ATTORNEYS.

(No Model.) 6 Sheets—Sheet 4.

G. W. DUDLEY.
ADDING MACHINE.

No. 555,038. Patented Feb. 18, 1896.

WITNESSES:
Fred G. Dieterich
Jos. A. Ryan

INVENTOR
George W. Dudley
BY Munn & Co
ATTORNEYS.

(No Model.) 6 Sheets—Sheet 5.
G. W. DUDLEY.
ADDING MACHINE.
No. 555,038. Patented Feb. 18, 1896.
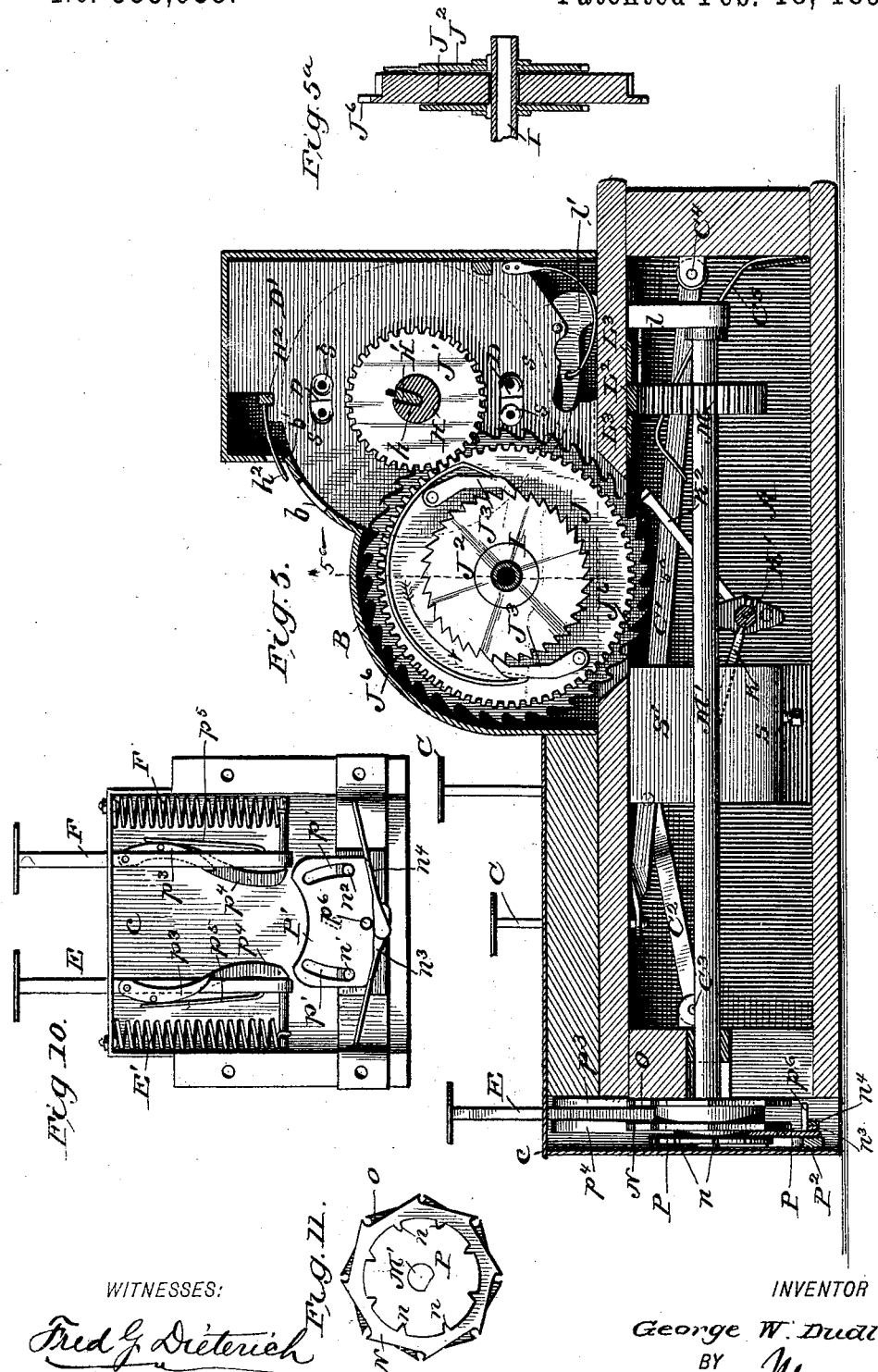
WITNESSES:
Fred G. Dieterich
Jos. A. Ryan
INVENTOR
George W. Dudley,
BY Mann & Co.
ATTORNEYS.

(No Model.)  6 Sheets—Sheet 6.
G. W. DUDLEY.
ADDING MACHINE.
No. 555,038.  Patented Feb. 18, 1896.
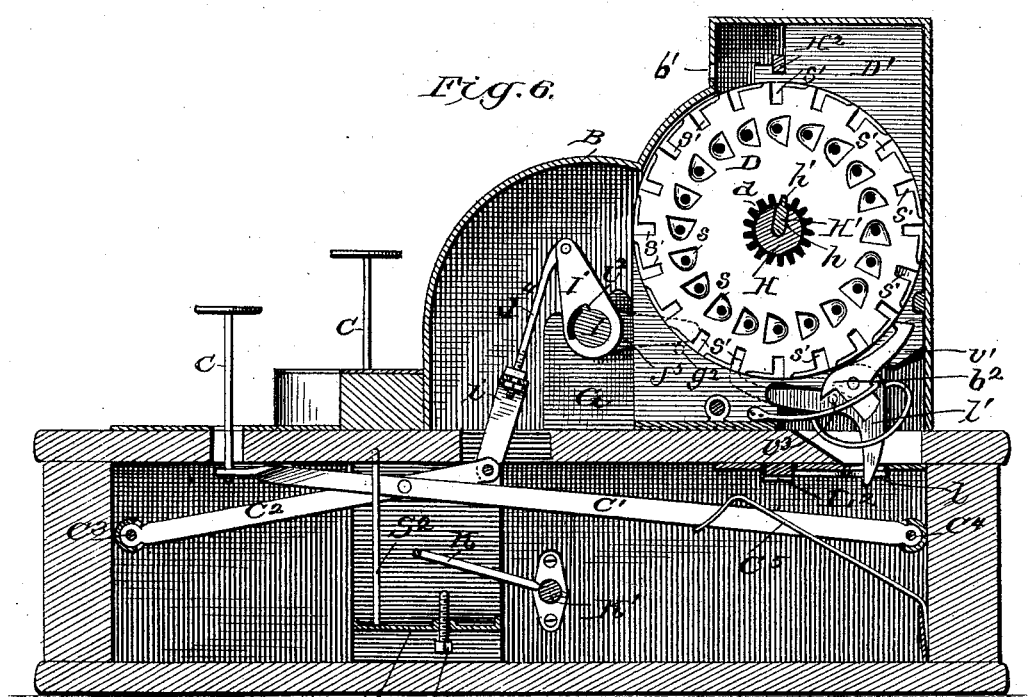
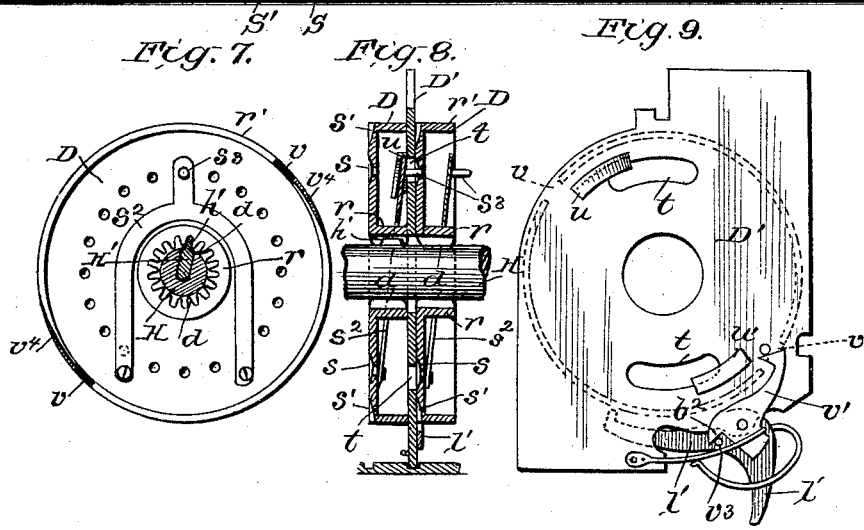
WITNESSES:
Fred G. Dieterich
Jos. A. Ryan
INVENTOR
George W. Dudley
BY Munn & Co.
ATTORNEYS.

UNITED STATES PATENT OFFICE.

GEORGE W. DUDLEY, OF CHARLESTON, WEST VIRGINIA, ASSIGNOR TO THE NUMEROGRAPH MANUFACTURING COMPANY, OF SAME PLACE.

ADDING-MACHINE.

SPECIFICATION forming part of Letters Patent No. 555,038, dated February 18, 1896.

Application filed May 8, 1893. Serial No. 473,375. (No model.)

*To all whom it may concern:*

Be it known that I, GEORGE W. DUDLEY, of Charleston, in the county of Kanawha and State of West Virginia, have invented a new and useful Improvement in Adding-Machines, of which the following is a specification.

The object of my invention is to provide a convenient and accurate adding-machine for the use of clerks and accountants in which addition may be quickly effected in the column of any denomination without reference to the usual order of progression of units to tens, tens to hundreds, &c.—that is to say, the addition may be performed by beginning at the left-hand column of figures or one of the middle columns just as well as if it started on the right-hand or units column in the usual way. It comprehends generally a series of rotating disks with numbers on their peripheries, one disk representing units, the next tens, and so on, and each arranged to move its neighbor of next higher denomination at every tenth space, the said disks being arranged to be operated by levers and keys, and having also an internal sliding adjusting device by which all of the keys may be made to operate upon a disk of any desired denomination, as hereinafter more fully described.

Figure 1:
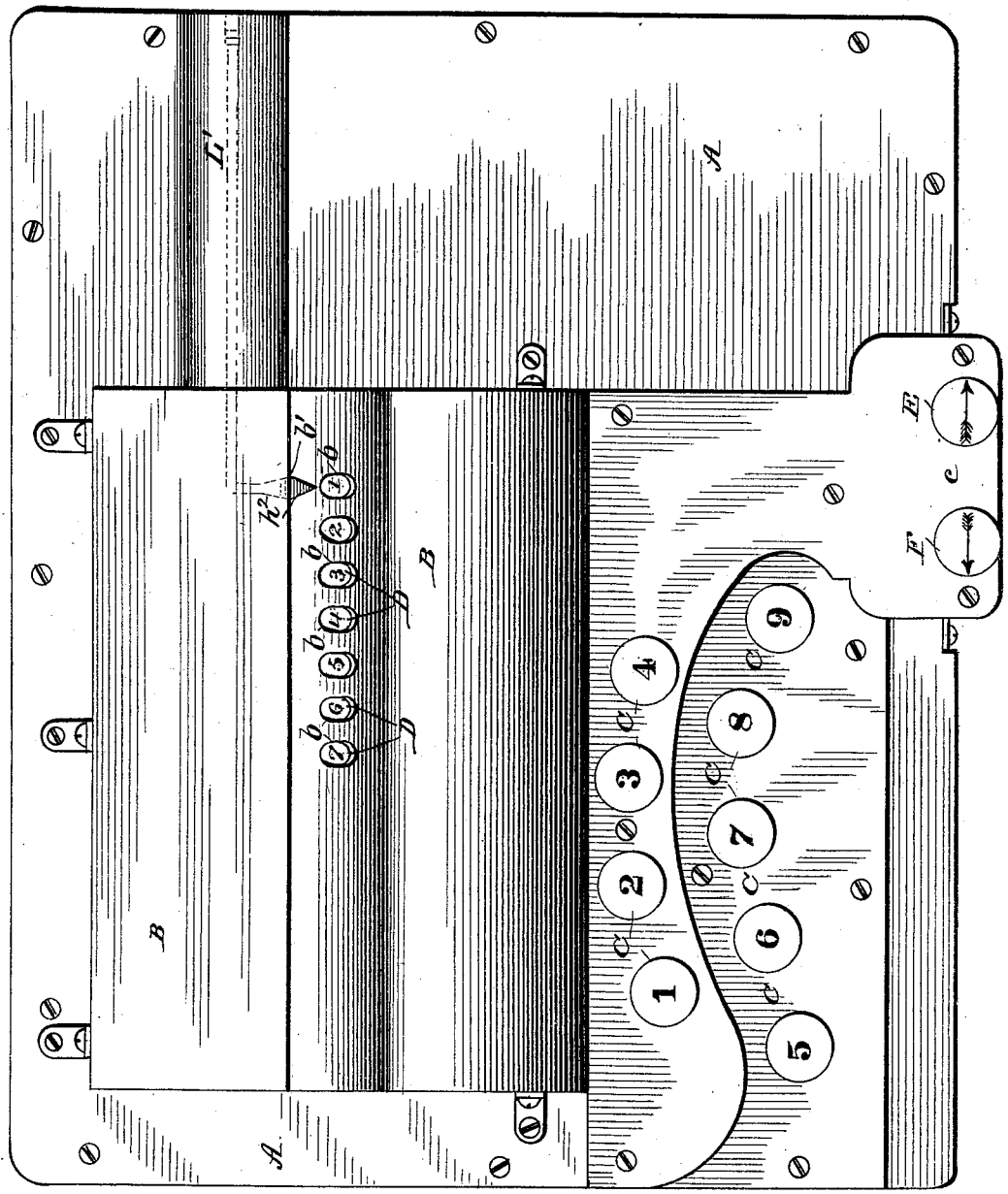
Figure 2:
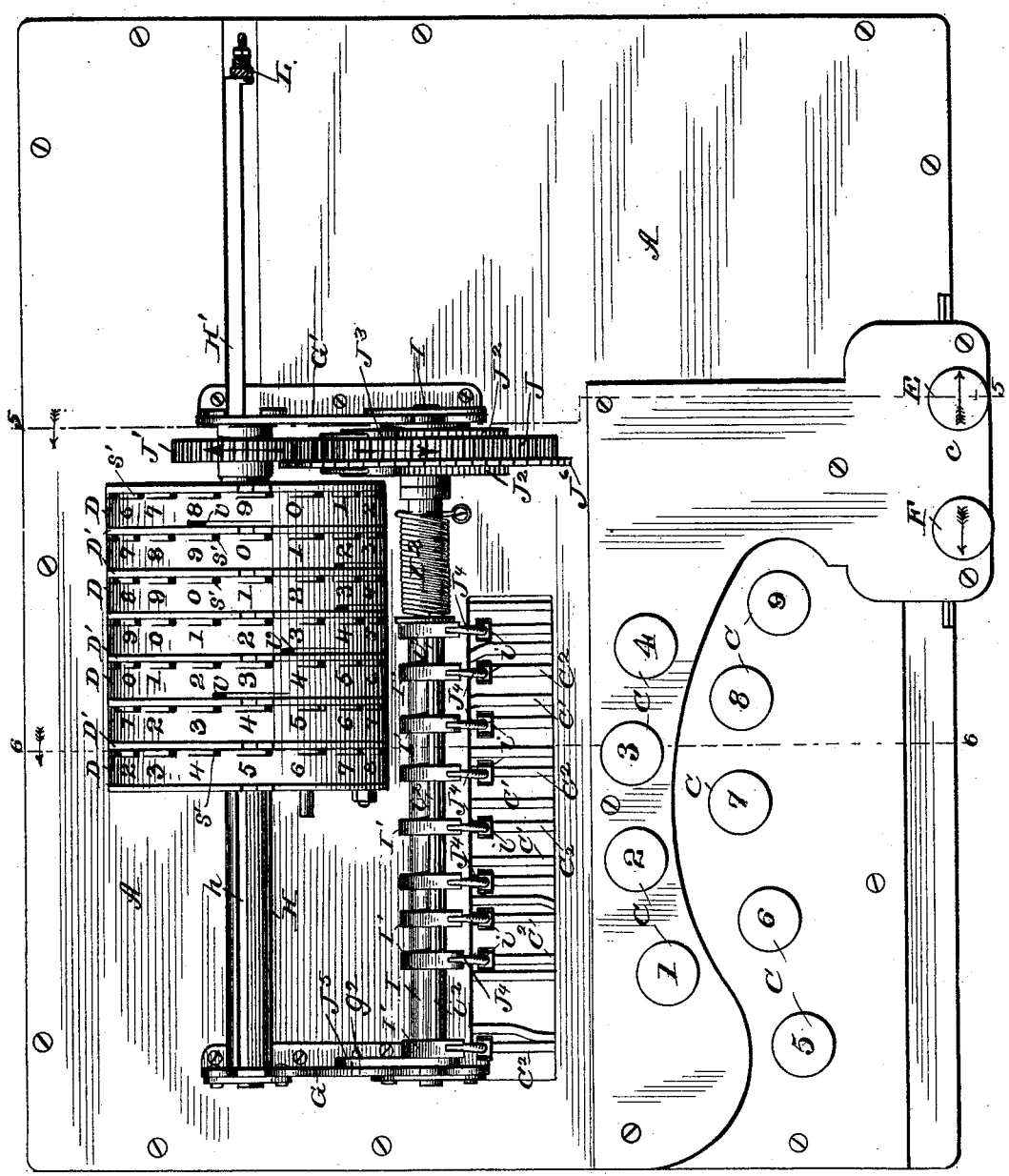
Figure 4:
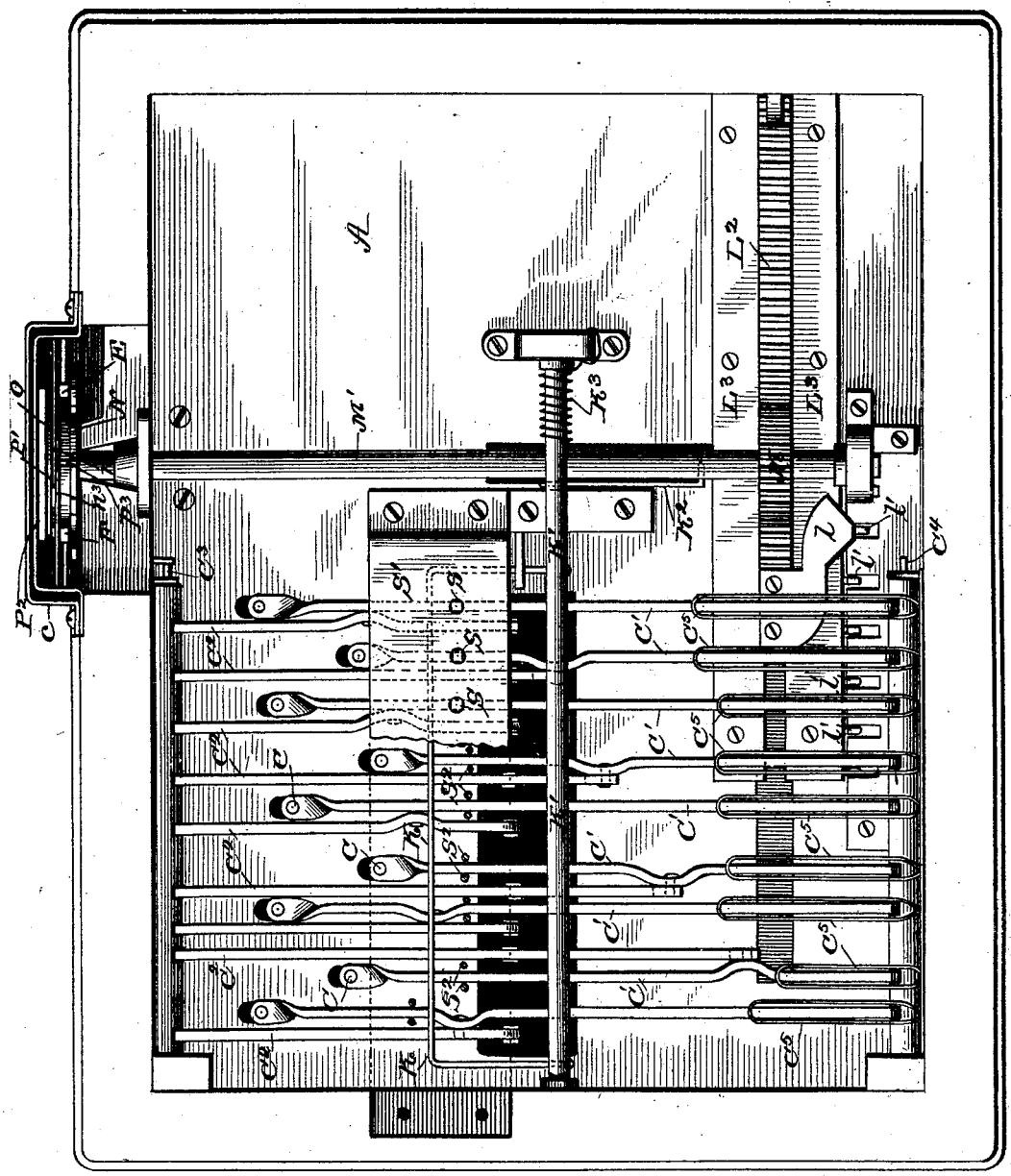

In the drawings, Figure 1 is a top plan view of my improved adding-machine. Fig. 2 is a similar view with the cover removed. Fig. 3 is a front elevation with parts broken away.
Fig. 4 is an inverted plan view with the bottom of the hollow base removed. Fig. 5 is a vertical transverse section on the line 5 5, Fig. 2. Fig. $5^a$ is a sectional detail of the gear-wheel J and its ratchets and shaft. Fig. 6 is a vertical transverse section on the line 6 6, Fig. 2. Fig. 7 is an inside face view of one of the numbered disks. Fig. 8 is a vertical section of two of such disks with one of the partitions in position. Fig. 9 is side view of one of the partitions with the locking-detent and releasing device. Fig. 10 is a detail view illustrating the shifting-key mechanism, and Fig. 11 is a detail view of the shifting-disks hereinafter referred to.

In order that my invention may be more quickly understood, I will in my specification first describe its general construction and arrangement of parts and its principal functions and afterward describe in detail the peculiar construction and arrangement of its several features.

In the drawings, A represents a suitable hollow base of wood or other desired material, and B is the cover to the working parts of the machine, which cover is made of sheet metal. C are the operating-keys, which are nine in number, marked by figures 1 to 9, respectively, and arranged in two rows, one a little above the other. In this cover B there appear slots or openings $b$, Figs. 1, 3, and 5, arranged in a row and corresponding to the positions of the numbered disks D within, whose numbers show successively through these openings. There may be any number of these openings and numbered disks, but as shown there are seven, so that addition may be performed running up into seven figures or millions. In the cover B is formed just above the row of holes $b$ a longitudinal slot $b'$, through which protrudes from the interior a pointer $h^2$, which always rests over the hole of the disk that is connected to the keys, it being understood that any one of the numbered disks may be connected to the operating-keys to the exclusion of all the others. This is for the purpose of enabling the operator when leaving off work to know upon his return what denominations he was working in.

F and E are two other keys which serve to adjust the pointer $h^2$, and contemporaneously and by the same movement serve to connect any one of the numbered disks to the operating-keys, so as to add any denomination at will. One of these keys, F, moves the pointer and the engaging devices for the numbered disks forward or to a disk of higher denomination one space at each depression of the key, and the other key, E, similarly moves the pointer (and the connecting devices for the disks and keys) backward the space of one disk at each depression of said key, so that it will be seen that the pointer and connecting devices for coupling the keys and disks may be moved to any denomination desired by running it forward or backward with a step-by-step motion through or by means of these keys F and E.

Having thus described the parts visible from the exterior of the instrument, I will now proceed to a description of the working parts beneath the cover. (See Figs. 2 and 6.)

G G' are two upright standard-plates fixed to the base and carrying two parallel shafts H and I. The shaft H carries loosely upon it the numbered disks D and constitutes their axial center. The shaft I is a part of the intervening mechanism between the keys and the numbered disks, whose construction and relation will now be described. This shaft I is a rock-shaft, and it is moved in one direction by a pull exerted upon one of the series of cranks I' through the keys, and in the other direction by helical spring $I^2$, one end of which is rigidly attached to said shaft I and the other end to the base. The oscillation of this shaft I gives a step-by-step rotation to the numbered disks through the toothed wheels J J'. The gear-wheel J is a loose wheel on shaft I. It receives motion from the shaft I through a ratchet-wheel $J^2$ arranged beside it, which ratchet-wheel is rigid on that shaft and engages in its forward movement with a pawl $J^3$ on the loose gear-wheel, carrying said gear-wheel with it. There are preferably two of these ratchets and pawls, one on each side of the gear J, as shown in Figs. 2 and $5^a$. On the backward movement of the shaft I the ratchet-wheel $J^2$ slides under the pawl and does not move the loose gear, it being held for this movement by its engagement with gear-wheel J' and the resistance of the helical spring $I^2$, said backward movement being limited by a lever $J^5$, which is rigid on the shaft I, engaging a pin $g^2$ in standard-plate G, as shown in Figs. 2 and 6.

As the gear-wheel J moves forward it turns the gear-wheel J', which is in mesh with it, and this gear-wheel J' being rigid on the shaft H turns the latter and also the numbered disks through the devices hereinafter described.

The cranks I' are pulled down by the action of the keys through links $J^4$, Fig. 6, each of which has a turnbuckle $i$ in its length for adjustment or taking up of any looseness. These links or turnbuckles are connected to horizontal levers $C^2$ within the hollow base, (see Figs. 4 and 6,) all of which levers $C^2$ are fulcrumed at one end independently upon an axial shaft $C^3$ and occupy a position parallel to each other. The levers $C^2$ are jointed to the horizontal levers $C'$, Figs. 4 and 6, whose free ends are connected to the vertical stems of the keys and whose opposite ends are fulcrumed to an axial shaft $C^4$ on the opposite side of the base from the axial shaft $C^3$. These levers $C'$ are forced upwardly by individual springs $C^5$, fixed to the rear of the base, and the tension of these springs serves also to hold up the keys C in an elevated position.

In connecting the levers $C'$ and $C^2$ the levers of each pair are jointed together at different points, Fig. 4, and their leverage is compounded, so that a definite and fixed descent of each key C gives a different extent of movement to each link $J^4$, said leverage being so adjusted that this extent of movement will be least for key No. 1 and nine times as much for key No. 9, and graduated so on between these keys, so as to make each key give a movement to the shaft H commensurate with the number which it represents, so that each key will cause the numbered disk to be turned a distance corresponding to the number of units which that key represents.

To connect the cranks I' rigidly to the shaft I and yet permit of the individual action of each crank without disturbing the others, the shaft I is provided with a longitudinal rib or key $i^2$, running through all of the cranks, (see Fig. 2,) each of which cranks is cut away circularly a distance equal to the throw of the 9's crank on one side of said rib or key, so that as the shaft oscillates its key or rib turns freely in the cut-away or enlarged portions in the cranks without disturbing the others.

When a key has been depressed and a movement transmitted to one of the numbered disks, it is important that the momentum of the connecting mechanism shall not carry it too far. For this purpose at the end of the stroke of each key its lever $C'$ or $C^2$ is made to strike a rocking frame K, (see Figs. 4 and 6,) which crosses all of said levers and is attached to a rock-shaft K'. As the shaft is thus rocked an arm $K^2$, Fig. 5, on the same is thrown into the teeth of the ratchet-wheel $J^4$ and prevents the gears J J' from being moved too far. When pressure on the key is released, the arm $K^2$ is removed from the ratchet-wheel, and the frame K is lifted again by the action of a helical spring $K^3$, Fig. 4, on the said shaft.

To adjust the stroke of the levers $C'$ and the keys C, so as to correct any looseness or errors in stroke, a series of set-screws S are arranged in a frame S', Figs. 4, 5, and 6, and act as so many stops to limit the downward movement of the levers. This frame S' is also provided with a series of parallel guide-studs $S^2$ to properly guide the middle parts of the jointed levers $C'$ $C^2$ on their up-and-down movement.

I will now proceed to describe how all of the adding-keys may be made to act upon any one of the numbered disks, so as to cause them to add tens, hundreds, thousands, &c., as well as units, and any one of these denominations without reference to the ascending order of progression.

Each one of the numbered disks D is formed at its inner axial bearing, where it revolves on the shaft H, with a circular series of inwardly-projecting teeth $d$, Figs. 6, 7, and 8, and within the shaft H is a longitudinally-adjustable bar H', which has a single narrow lug $h'$ that projects through a longitudinal slot $h$ in shaft H and is adapted to pass between the inwardly-projecting teeth $d$ of the numbered disks. This lug $h'$ is less than or just equal in width to the thickness of the disk. When this lug is engaged with such internal gear-teeth, the numbered disk having that internal gear is locked rigidly to the adjustable bar H' and rotary shaft H, so that the step-by-step rotation of the shaft H is transmitted to that numbered disk whose internal gear is engaged by the lug $h'$ on the adjustable bar H', and all the other numbered disks are loose on the shaft H and are not actuated by its revolution. This bar H' may be adjusted longitudinally to bring its lug into engagement with any one of the numbered disks, so that the keys may rotate at the will of the operator the numbered disk of any denomination.

The bar H' is extended entirely through one end of the shaft H and has an arm H², Figs. 3, 5, and 6, that is bent up and over the numbered disks and has attached to it the pointer $h^3$ that protrudes through the slot $b'$ in the cover B, and points always to the numbered disk that is rigidly connected to the actuating-shaft H for operation. This pointer $h^3$ and adjustable bar H' are mounted upon and moved by a standard L, Figs. 3, 4, 5, and 6, working in a housing L' and descending through a slot in the base, where it is attached to a rack-bar L², Figs. 4 and 5, playing in guides L³ L³ within the base. This rack-bar has a triangular releasing-cam $l$, Fig. 4, that deflects a detent or pawl $l'$, (see Fig 6,) and unlocks the numbered disk D that has been engaged by the lug of the adjustable bar H'. This cam $l$ is made to press against and release any one of the detents $l'$ of the numbered disks according to the position of the parts, always unlocking the periphery of that disk which is to be operated.

The rack-bar L² serves to effect three functions. It adjusts the pointer, locks the internal gear of the numbered disk to be worked, and (see Fig. 6) unlocks the detent $l'$ from the notches $s'$ in the periphery of the same disk, as hereinafter more fully described. The rack-bar L² itself is moved by a gear-wheel M, Figs. 4 and 5, on the shaft M', crossing the rack-bar at right angles and journaled in bearings within the base. This shaft is given a step-by-step motion either backward or forward by the two keys F and E through the following mechanism.

Into a casing $c$, Figs. 2 and 3, outside the base A the end of the shaft M' is projected, and is provided with two rigidly-attached ratchet-wheels N and O, and also a rigidly-attached stop-disk P, Fig. 11. The ratchet-wheels have their teeth pointing in opposite directions, and they are respectively acted upon by plunger devices attached to the keys E and F to rotate the shaft M' in one direction or the other. The stop-disk P has notches $n$ in its periphery corresponding in number and position to the teeth of the ratchet-wheels. With these notches there engages a double-acting detent—i. e., a detent that is acted upon and released by either one of the keys E and F. This detent consists of a plate P', Figs. 3 and 10, having a central lug or tooth $p$, Fig. 3, projecting laterally therefrom and adapted to enter the notches of disk P. This plate is supported in a peculiar manner by a bracket P² attached to the base. In each end of the plate P' there is a curved slot $p'$ $p'$, Fig. 10, which slots embrace short guide-pins $n'$ $n^2$ attached to the bracket. Spring-arms $n^3$ $n^4$ also extend from each side of the bracket and, resting beneath a pin or offset $p^6$ on the same, tend always to hold the detent-plate and its tooth $p$ (which is on the opposite side) up into the notch of disk P. When either end of the detent-plate is depressed (by the action of one or the other of the keys E and F) the tooth $p$ of said detent is removed from the stop-disk P, and when any one of said detent-plates is depressed the slot and pin at that end act as a guide for this movement, while the other pin, occupying a position in the ends of the slot, acts, from the tension of the spring-arms, as a center of oscillation. This action takes place no matter which end of the plate is depressed.

I will now describe how the descent of either key F or E serves to rotate one or the other of the ratchet-wheels N and O, and also unlocks the detent-plate.

As each key E and F is substantially like the other in its construction and operation, it will be necessary to describe only one of them. The shank of the key is a vertical stem made square in cross-section (see Fig. 4) where it passes through the casing and has an arm or point of attachment at its lower end, to which is attached a helical spring E' or F', Fig. 10, to cause the keys to rise again after being depressed. The shanks of these keys carry two active parts, one being a pawl $p^3$ and the other a push-bar $p^4$. The pawl is designed to act upon one of the ratchet-wheels N O, and the push-bar serves to depress the detent-plate P' to unlock the disk P and allow the pawl to turn the ratchet. The pawl, by engaging the ratchet N or O above the center, receives a lateral motion as the key F or E is depressed, which lateral motion is transmitted to the push-bar $p^4$, causing it to pass off the end of plate P', so as to allow the latter to rise again with its lug $p$ to lock disk P again at the right point. For this purpose the pawl and push-bar are rigidly connected together through their axis, and a single spring-arm $p^5$ is made to render them both yielding.

For one of the keys E the pawl and push-bar are on opposite sides of the shank of the key, while for the other key both the pawl and push-bar are on the same side of the shank of the key. This is necessary in order to bring the pawls and push-bars of the two keys in proper relation to the planes of the two ratchet-wheels and notched disk. The action of each key with its pawl and push-bar is the same as the other, except that one key acts upon one ratchet-wheel and rotates the shaft M' in one direction, and the other acts upon the other ratchet-wheel and rotates the shaft M' in the other direction. This opposite movement of the shaft M', it will be seen, serves through the devices hereinbefore described to couple the keys to any one of the numbered disks at will.

I will now proceed to describe the construction and arrangement of the numbered disks and the method of carrying from one to the other.

The disks D alternate with fixed metal plates D', Figs. 2, 8, and 9. The disks are made hollow, (see Fig. 8,) with a central hub $r$, in which is formed the internal gear through which they are actuated and with a peripheral flange $r'$, on the exterior of which are formed or engraved the numerals 0, 1, 2, 3, 4, 5, 6, 7, 8, and 9. For the purpose of reducing the throw of the 9's crank, and consequently the power necessary to carry the disk through what would otherwise be nine-tenths of a revolution, each disk has two series of digits, one following in succession after the other, and therefore the carrying from one disk to the next must be effected at each half-revolution. It will be understood that there may be only one series of digits around the entire periphery, or there may be more than two without departing from the principles of my invention.

On the external face of each hollow disk, a short distance from the outer periphery, there is formed a circular series of gouged-out notches $s$, Fig. 6, which correspond in number and position to the numbers on the periphery of the disk. With these notches the carrying device engages. Outside these notches and opening upon the edge of the periphery is a second series of notches $s'$, with which the detents or locking devices $l'$ for the disk engage. (See Figs. 6 and 9.) On the inside of the hollow disk there is a forked spring $s^2$, straddling the hub and bearing at its free end a pin $s^3$, which forms the carrying device and operates through the partition-plate upon the next disk of higher denomination. This spring has its legs secured to the disk, and has a spring motion at right angles to the plane of the disk.

The alternating partition-plates D' which separate the disks are formed at two diametrically-opposite points with short curved slots $t$, Fig. 9, which give passage to the carrying-pin $s^3$ of one disk, so that it may enter the series of notches $s$ of the next disk of higher denominations and turn it one space. As this is required to be done at the end of each series of digits, with the construction shown there are two of said slots, and whenever the figure 9 shows through an opening in the top of the case the carrying-pin $s^3$ protrudes through one of the slots in the partition-plate D', and at the next movement turns the next disk of higher denomination. At each opening in the partition-plate there is a cam-flange, one, $u$, at the entrance of one slot on the outer edge of the same, and another, $u'$, at the edge of the slot upon the other side. These cam-flanges $u\,u'$ serve to withdraw the carrying-pin from the slot after having been forced through the same by the spring of the forked shank.

I have already referred to detents $l'$ for locking the numbered disks and the means for releasing them at will. In the act of carrying in the automatic operation of the machine, it will be perceived that this detent must also be released whenever one disk acts upon and carries or turns the next. This detent is constructed as an elbow-lever and its tooth engages the row of notches $s'$, Fig. 6. This detent must be thrown out at each carrying operation, and for this purpose each numbered disk has on its periphery at the end of each series of digits a depression $v$, Figs. 2 and 7, and into it is made to drop a spring-catch $v'$, Figs. 6 and 9, which catch has a toe $b^2$ that bears against a pin $v^3$ on the detent $l'$ (that locks the disk of next higher order) and throws the detent out of contact with the notches of the disk, as shown in Fig. 9 by dotted lines. It will thus be seen that the device $v'\,b^2$ is in the nature of a releasing device for the disk. As this action takes place at the end of each series of digits, it occurs twice in the revolution of the disk, and when it occurs the disk of next higher denomination is unlocked from its detent $l'$ and carried one notch by the disk of next lower denomination through the agency of the carrying-pin $s^3$. Both the spring-catch $v'$ and detent $l'$ are pivoted to and carried by the partition-plate, and the depression $v$ has upon one side an inclined face $v^4$, Fig. 7, so as to permit the spring-catch to ride up onto the periphery of the disk again as it makes its further movements.

Having thus described my invention, what I claim as new, and desire to secure by Letters Patent, is—

1. The combination in an adding-machine, of a series of numbered disks having internal gear-teeth, an axial shaft for the same, a sliding bar moving longitudinally within said shaft and having a lug or tooth projecting outwardly and adapted to engage the internal gear of any disk, a series of nine operating-keys geared to the axial shaft to operate it, and a pair of adjusting-keys with mechanism connecting them directly to the sliding bar independently of the operating-keys, one of said adjusting-keys serving to move the sliding bar forward and the other backward, substantially as shown and described.

2. The combination in an adding-machine, of a series of numbered disks representing different denominations, a cover for the disks with an opening in it for the exposure of a part of the periphery of each disk, a pointer arranged to be adjusted along the series, a set of operating-keys, a pair of adjusting-keys, and a connecting mechanism between the adjusting-keys and disks, to couple the operating-keys to any one of the disks and by the same movement to adjust the pointer to said disk substantially as shown and described.

3. The combination of the numbered disks D having internal gear $d$, the axial shaft H with slot and adjustable bar H' having lug $h'$ arranged within the shaft H, the pointer-arm H² with pointer $h^2$ attached to said bar, and means for moving said bar back and forth substantially as shown and described.

4. The combination with the adjustable bar H', with locking-lug, and the numbered disks with internal gears as described; of the standard L, rack-bar L², the shaft M' with gear-wheel M, and a double-acting ratchet mechanism with keys F E for rotating said shaft in either direction, substantially as shown and described.

5. The combination with the disks D having detent-notches $s'$ on their periphery, and detents $l'$ engaging therewith; of a cam $l^3$ for releasing one of said detents, the rack-bar L² carrying the cam, and mechanism for operating this rack-bar and throwing one of the disks into operative connection substantially as shown and described.

6. The combination with the rack-bar and its actuated parts; of a shaft M' with gear-wheel M, reversed ratchet-wheels N and O, and notched stop-disk P, a detent-plate for the stop-disk and the yielding keys E and F with pawls operating upon the ratchets and push-bars for releasing the detent-plate, substantially as shown and described.

7. The combination with the adjusting devices of an adding-machine as described; of a shaft with double-acting-ratchet mechanism consisting of reversed ratchets N and O and stop-disk P, rigidly attached to the shaft, the detent-plate P' with tooth $p$ and slots $p'\ p'$, fulcrum and guide pins $n'\ n^2$, springs $n^3\ n^4$, and the keys having each a yielding pawl $p^3$ operating upon the ratchets, and push-bars $p^4$ adapted to operate upon opposite ends of the detent-plate, the said pawl and push-bar being axially connected substantially as shown and described.

8. The combination of the numbered disks and an axial shaft for actuating them having a gear-wheel J', the loose gear J with pawl J³, shaft I arranged parallel to the disk-shaft and having rigid ratchet-wheel J², spring I² and rib $i^2$, the loose wheel J hung upon shaft I and meshing with wheel J' and connected to the ratchet-wheel by a pawl, the cranks I' cut away at their axial bearings, and a series of keys, key-levers, and links, connecting with said cranks substantially as shown and described.

9. The combination with the disks; of the keys C, the two sets of levers C' and C² fulcrumed at their outer ends and pivotally connected in the middle in pairs each for a different leverage for each key, and connecting mechanism for imparting the different throw of each key to the disks substantially as shown and described.

10. The combination with the keys and subjacent devices C' C² consisting of compound levers fulcrumed at their outer ends and jointed together in the middle; of the bracket or frame-piece S' having guide-stem S² separating the middle parts of the compound levers, and adjusting stop-screws S substantially as and for the purpose described.

11. The combination of the numbered disks having notches on their peripheries corresponding to the numerals and a tripping-recess $v$ with inclined sides for each series of numerals; of a spring-catch $v'$, and a locking-detent $l'$, the said tripping-catch being loosely connected to the detent and arranged as described to drop into said recess and disengage the detent from the notches in carrying from one disk to the next substantially as shown and described.

GEORGE W. DUDLEY.

Witnesses:
 SOLON C. KEMON,
 FRED G. DIETERICH.